US006985240B2

(12) United States Patent
Benke et al.

(10) Patent No.: US 6,985,240 B2
(45) Date of Patent: Jan. 10, 2006

(54) METHOD AND APPARATUS FOR RETRIEVING INFORMATION ABOUT AN OBJECT OF INTEREST TO AN OBSERVER

(75) Inventors: Oliver Benke, Leinfelden-Echterdingen (DE); Boas Betzler, Magstadt (DE); Thomas Lumpp, Reutlingen (DE); Eberhard Pasch, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 10/328,241

(22) Filed: Dec. 23, 2002

(65) Prior Publication Data

US 2004/0119986 A1 Jun. 24, 2004

(51) Int. Cl.
*G01B 11/14* (2006.01)
*A63F 3/00* (2006.01)

(52) U.S. Cl. .............. 356/614; 356/139.03; 356/141.4; 345/633; 702/153

(58) Field of Classification Search .. 356/141.1–141.5, 356/622, 139.03, 140, 614–615; 345/113–116, 345/633; 702/153; 324/207.13; 634/578–579
See application file for complete search history.

(56) References Cited

U.S. PATENT DOCUMENTS 5,323,174 A * 6/1994 Klapman et al. ........... 345/156
5,347,289 A * 9/1994 Elhardt ....................... 342/448
5,552,989 A 9/1996 Bertrand
5,577,981 A * 11/1996 Jarvik ........................... 482/4
5,614,898 A 3/1997 Kamiya et al.
5,767,795 A 6/1998 Schaphorst (Continued)

FOREIGN PATENT DOCUMENTS

DE 19747745 A1 7/1999

(Continued)

OTHER PUBLICATIONS

Foley, James D., Andries van Dam, Steven K. Feiner and John F. Hughes, *Computer Graphics: Principles And Practice*, Second Edition, 1990, Addison-Wesley Publishing Company, Inc., pp. 533-562.

*Primary Examiner*—Gregory J. Toatley, Jr.
*Assistant Examiner*—Sang H. Nguyen
(74) *Attorney, Agent, or Firm*—William A. Kinnaman, Jr.

(57) ABSTRACT

A method and apparatus for retrieving information about an object of interest to an observer. A position sensor wearable by the observer generates position information indicating the position of the observer relative to a fixed position. A direction sensor wearable by the observer generates direction information indicating the orientation of the observer relative to a fixed orientation. An object database stores position information and descriptive information for each of one or more objects. An identification and retrieval unit uses the position and direction information to identify from the object database an object being viewed by the observer by determining whether the object is along a line of sight of the observer and retrieves information about the object from the database. The identification and retrieval unit retrieves the descriptive information stored for the object in the database for presentation to the observer via an audio or video output device. Either two-dimensional (2D) or three-dimensional (3D) data is stored and processed, depending on the necessity to discriminate between vertically spaced objects.

24 Claims, 6 Drawing Sheets

U.S. PATENT DOCUMENTS

| | | | | |
|---|---|---|---|---|
| 5,786,849 | A | 7/1998 | Lynde | |
| 5,812,257 | A * | 9/1998 | Teitel et al. | 356/141.4 |
| 5,847,976 | A * | 12/1998 | Lescourret | 703/8 |
| 5,896,215 | A | 4/1999 | Cecil et al. | |
| 5,990,900 | A * | 11/1999 | Seago | 345/427 |
| 6,496,776 | B1 * | 12/2002 | Blumberg et al. | 701/213 |
| 6,559,935 | B1 * | 5/2003 | Tew | 356/139.03 |
| 6,633,304 | B2 * | 10/2003 | Anabuki et al. | 345/633 |

FOREIGN PATENT DOCUMENTS

| | | | |
|---|---|---|---|
| WO | WO 95/19577 | * | 7/1995 |
| WO | WO 96/35960 | * | 11/1996 |
| WO | WO 9918732 | A1 | 4/1999 |
| WO | WO 01/09812 | A1 | 2/2001 |
| WO | WO 01/35600 | A2 | 5/2001 |
| WO | WO 01/42739 | A1 | 6/2001 |

* cited by examiner

METHOD AND APPARATUS FOR RETRIEVING INFORMATION ABOUT AN OBJECT OF INTEREST TO AN OBSERVER

BACKGROUND OF THE INVENTION

1. Field of the Invention

This invention relates to a method and apparatus for retrieving information about an object of interest to an observer. More particularly, it relates to such a method and apparatus for retrieving and displaying information about objects of interest to an observer touring an indoor or outdoor area.

2. Description of the Related Art

Often a person touring a museum, city or the like will want to accompany his tour with the presentation of pertinent information about the exhibits or points of interest he is viewing without having to leaf through a guide book or engage the services of a tour guide. To meet this need, several electronic systems have been developed. Perhaps the oldest and best known is an audio tape player that the person carries which plays descriptions of exhibits in a fixed order and at a fixed pace. The user has to follow the directions on the tape to get to a specific exhibit, then the explanation is played. Thus the user must conform his itinerary to the program, rather than the other way around, and must pause or fast-forward as needed to match his speed with that of the audio presentation.

More recently, electronic systems have been developed that automatically sense an object of interest that a person or vehicle is approaching and play an appropriate description from a repository of such descriptions. Such systems are described, for example, in published PCT applications WO 01/09812 A1, WO 01/35600 A2, and WO 01/42739 A1; U.S. Pat. Nos. 5,614,898, 5,767,795 and 5,896,215; and German patent publication DE19747745A1. All of these system, however, have various disadvantages.

U.S. Pat. No. 5,767,795 describes a vehicle-based system that uses a Global Positioning System (GPS) sensor to retrieve information on adjacent objects from a local repository. In this system, however, the only direction information available (which is derived by examining the position information for successive instants of time) is the direction of the vehicle itself, which is of no help in identifying an object off the path of the vehicle. Also, the data repository is local and must be replicated for each vehicle. U.S. Pat. No. 5,614,898 describes yet another vehicle-based system with similar limitations.

Other systems have been designed for individuals. The systems described in U.S. Pat. No. 5,896,215 and PCT application WO 01/42739 A1 rely on infrared transmitters in the objects of interest. Thus, U.S. Pat. No. 5,896,215 discloses a system in which directional infrared transmitters are used to convey information from exhibit booths to a directional infrared receiver that is either carried by the individual or worn on a badge or on the individual's head. Such systems, however, require the objects to play an active part in the system operation.

PCT application WO 01/35600 A2 describes a personal tour guide system that uses the detected location of a portable unit to access relevant information about an adjacent object of interest. This system does not require the objects to play an active part in the system operation. However, since it uses only position information, it cannot readily discriminate between adjacent objects that may be of interest to the observer. German patent publication DE19747745A1 is similar in this respect.

Another system, described in PCT application WO 01/09812 A1, uses a mobile position sensor together with a direction sensor mounted in a sighting device that the user points at the object of interest. The position and direction information are used to retrieve data on the object being sighted from a local data repository. While this system does not require the objects to play an active part and uses direction information, it requires that the user point the sighting device at the object. Also, since the data is stored locally, the repository has a relatively limited capacity and must be replicated for each user.

SUMMARY OF THE INVENTION

In the present invention, one piece of data is the position of an observer (using a positioning system technology like GPS or other sensors in the room). This provides the position coordinates (x, y) or (x, y, z), depending on the application as described below. The basic idea is to use a direction sensor mounted on an observer, preferably on the head of the observer, to sense his direction of vision. The direction sensor is oriented with a static relation to the direction of vision of the observer. Using digital mapping information provided from a database, the location and orientation information is used in a ray-tracing algorithm to find the object in view. The database also contains information about the object being viewed—including, without limitation, rich media and background information—which can be presented to the user via a headset, video display or the like.

More particularly, the present invention contemplates a method and apparatus for retrieving information about an object of interest to an observer, as in an indoor area such as a museum or an outdoor area such as a city. In accordance with the invention, a position sensor wearable by the observer generates position information indicating the position of the observer relative to a fixed position, while a direction sensor wearable by the observer generates direction information indicating the orientation of the observer relative to a fixed orientation. An identification and retrieval unit uses the position and direction information to identify from an object database an object being viewed by the observer and retrieves information about the object from the object database. (In this specification, the word "object" refers to the physical objects being viewed by the observer, not the objects of object-oriented programming. Thus, while it would be possible to use various technologies realizing a so-called object database that is capable of persistently storing objects, the database described herein is not necessarily such an object-oriented or object-relational database.)

The position and direction information may be either two-dimensional (2D) or three-dimensional (3D), depending on the necessity to discriminate between vertically spaced objects (such as on different floors of a building).

Preferably, the direction sensor is wearable on the head of the observer so that it indicates the orientation of his head. The direction sensor may be carried by an article wearable on the head of the observer, such as a headset, a helmet, a pair of spectacles or the like. The direction sensor indicates the relative rotation (angle a below) of the head of the observer about a vertical axis. In a 3D implementation, it also indicates the relative inclination (angle b below) of the head of the observer about a horizontal axis extending laterally of the head of the observer.

The object database preferably comprises a centralized or distributed database that is remote from the observer. The object database stores position information and descriptive information for each of one or more objects. In response to the generation of new observer position information or direction information, the identification and retrieval unit determines from such information, together with position information stored in the database for an object, whether the object is along a line of sight of the observer. If so, the identification and retrieval unit retrieves identifying and descriptive information about the object for presentation to an output device such as an earphone or video display.

The invention may be used, for example, to give user additional information at a trade show or museum. When user looks at a picture, the system will provide additional information on the object, for example, the name of the artist or the history of an artifact. In a trade show, the system can provide navigation aids.

The present invention provides more freedom to the user by taking into consideration the actual position and direction of vision of the user. In contrast to positioning systems that only provide information about position or direction of movement, the present invention considers the direction of vision, using a compass or other direction sensor with a static relation to the direction of view.

By using the invention in a mobile device, the actual position and direction of vision of the observer can be obtained. The object database contains the object location as well as information on the object. Combining the user's direction of view and the object location, the system can identify the artifact which is observed. With this data it is possible to recall information on the object stored in a database and play it to the user.

DESCRIPTION OF THE PREFERRED EMBODIMENTS

Figure 1:
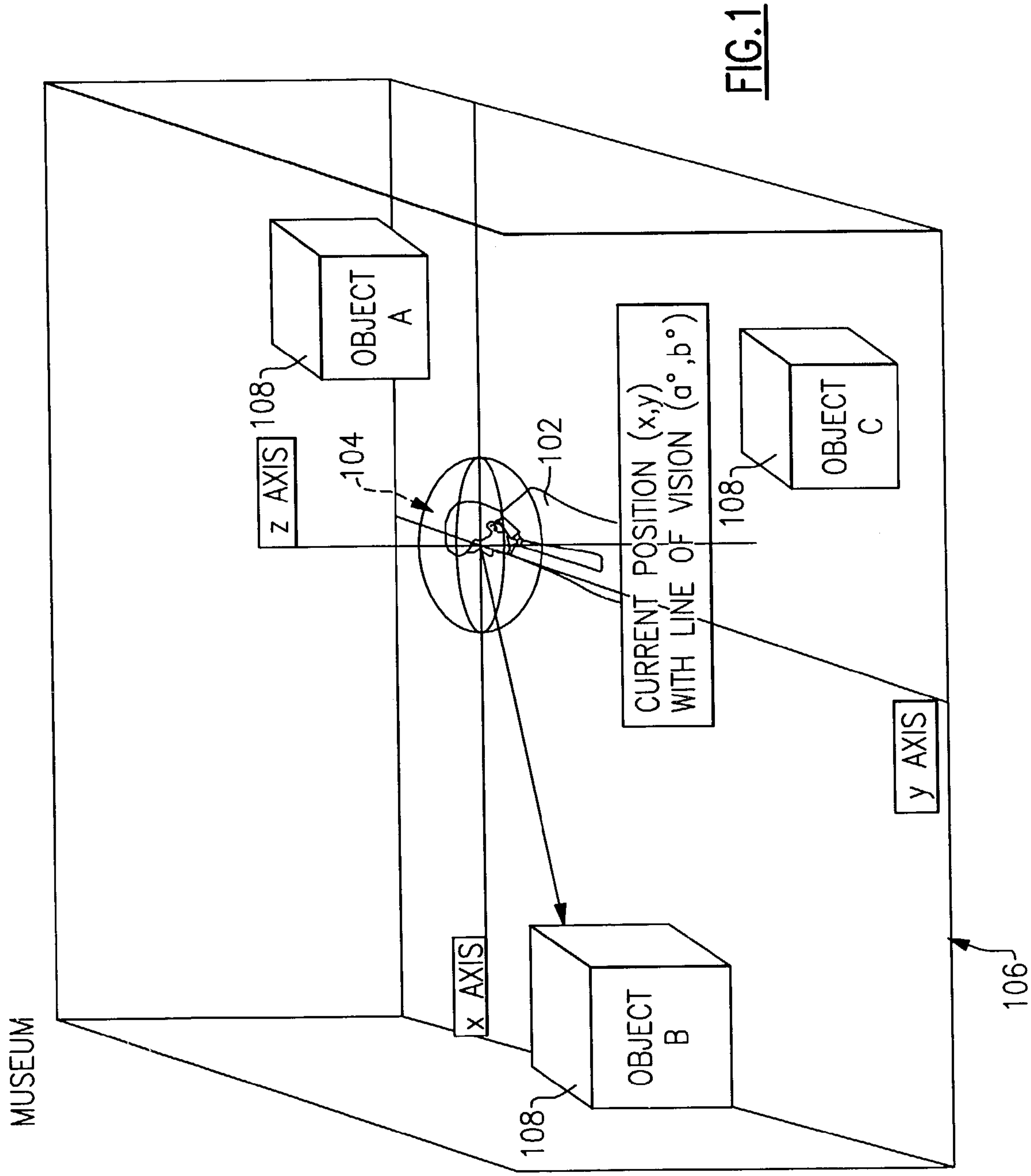
FIG. 1 shows one intended environment of the present invention.

FIG. 1 shows one intended environment of the present invention. As shown in this figure, a user 102 wears a mobile unit 104 containing the portable components of the invention as described below. The user 102 with his mobile unit 104 moves about an area 106 containing various objects 108 (A–C) of interest to the user 102. If the area 106 is an enclosed area such as a museum or an exhibit hall, objects 108 may be various exhibits. On the other hand, if the area 106 is an open area, such as a city, then the objects 108 may themselves be buildings or the like.

Figure 2:
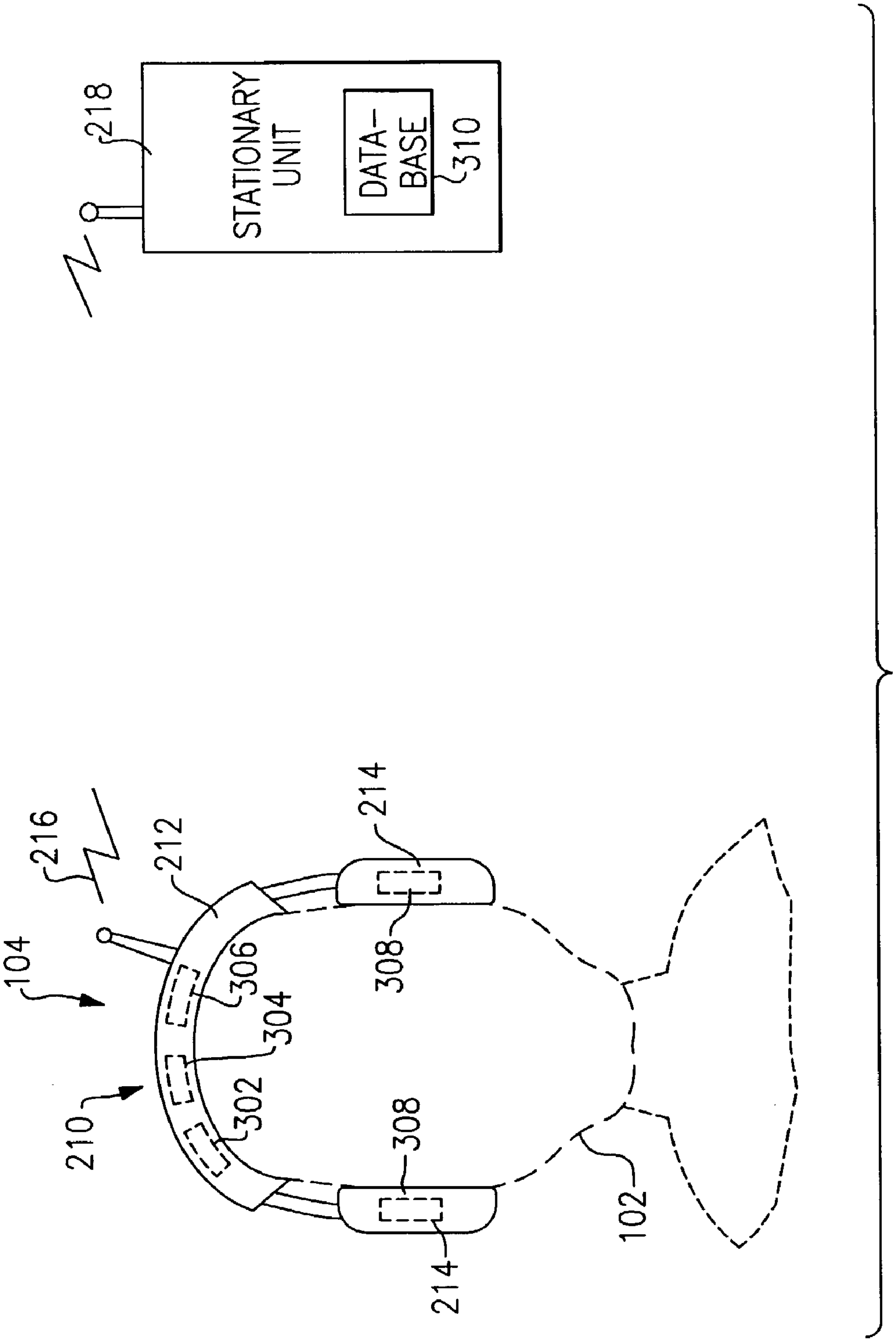
FIG. 2 shows the various components of the present invention from a physical viewpoint.
Figure 3:
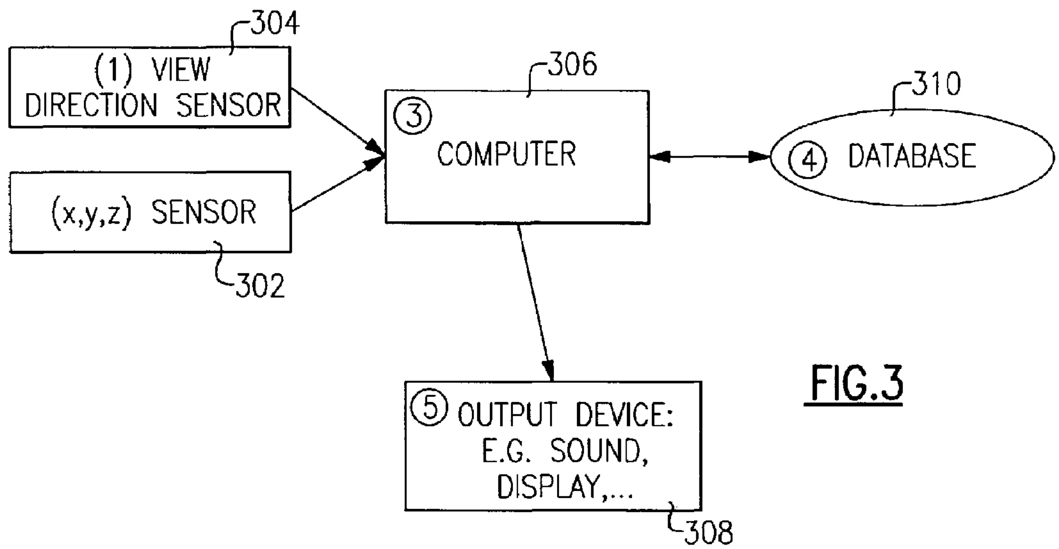
FIG. 3 shows the various components of the present invention from the schematic standpoint of their functional interaction.

FIG. 2 shows the various components of the present invention from a physical viewpoint, while FIG. 3 shows them from the schematic standpoint of their functional interaction. Referring to these two figures, mobile unit 104 comprises a headset 210 made up of a headband 212 and a pair of earcups 214. Headband 212 contains a position sensor 302, a direction sensor 304, and an identification and retrieval unit 306 to be described in more detail below, while earcups 214 contain earphones functioning as an output device 308. Headset 210 is preferably designed so that left earphone cannot be used on the right ear, or vice versa, since the direction sensor 304 should always have a fixed relation to the forward direction of the observer. Information and retrieval unit 306 communicates via a wireless connection 216 with a stationary unit 218 containing a database 310 to be described.

Any suitable technology may be used for the wireless connection 216, which only needs to be established within sight of an object of interest. For small areas, the wireless connection 216 might be a WiFi implementation using an 802.11b protocol or the like. In the case of a city guide, a wider-range wireless connection 216 such as a cellular communication system would be used. In addition to these forms of connection, it is reasonable to assume that in the future, other wireless communication systems that would be suitable for the wireless connection 216 will become widely available.

Although a mobile unit 104 comprising a headset 210 is shown, it is possible to use other types of headpieces as well, such as a helmet or a pair of spectacles, as well as a mobile unit 104 that is worn by the observer 102 in one or more pieces on other parts of his body. In general, the system should be simple and inexpensive, and the gear to wear unobtrusive for the user. Thus, the position sensor 302 could be worn in a backpack or on a shoulder strap, just like recorders are used today. The direction sensor 304 could be mounted on the torso so that it always faces forward. Still other types of mobile units 104 are possible as long as the position sensor 302 moves with the wearer and the orientation of the direction sensor 304 bears a fixed relation to either a straight-ahead line of sight from the wearer (if worn on the head) or to an object directly in front of the wearer (if worn elsewhere on the body). However, having at least the direction sensor 304 on an article that moves with the head of the observer is highly desirable. The output device 308 usually requires a headset of some sort in any event, which might as well be used to mount the direction sensor 304. Also, having the direction sensor 304 move with the head allows the observer 102 to target an object 108 by turning his head without having to turn his whole body. Further, it allows the observer 102 to individually target objects that are spaced vertically from one another by tilting his head up and down, as described below.

Position sensor 302 is a device that can return the position on the earth's surface (x, y) and the height above ground (z) of the mobile unit 104. More generally, position sensor 302 generates position information indicating the position of the mobile unit 104 relative to a fixed position. An example of such a position sensor 302 is a Global Positioning System (GPS) device. The particular choice of position sensor 302 would depend on the application. For use in a city or similarly large area, a GPS device using satellite-based reference points may be appropriate. For a more restricted area such as a museum, on the other hand, a local positioning system using more closely spaced reference points such as points within the museum may be a better choice. In either event, position sensor 302 may be implemented using well-known, readily available technology. Provided that the position sensor 302 moves with the wearer and generates the required outputs, the particulars of its implementation form no part of the present invention.

The z-coordinate output from position sensor 302 is used for scenarios like a museum with several floors, where three-dimensional (3D) position information is needed. For the situation where the user is roaming about a city, two-dimensional (2D) (x, y) position information will generally suffice and the z-coordinate can be ignored.

Figure 5A:
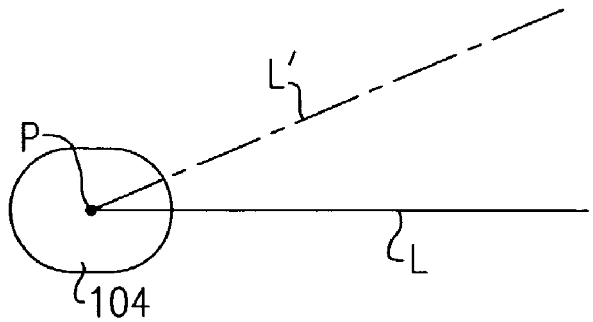
FIGS. 5A and 5B show the basic geometry of a line of sight from the mobile unit.

View direction sensor 304 is a device that can return its relative orientation, and thus the relative orientation of the user 102. Referring to FIG. 5A, which is a top view, when the wearer of the mobile unit 104 looks straight ahead, he looks along a line of sight L from a point P located such that, when the wearer turns his head or body to acquire a new line of sight L', the old line of sight L and the new line of sight L' intersect at the point P. For a head-mounted mobile unit 104, point P may be regarded as the eyepoint of the observer 108. More generally, in the description that follows, point P is regarded as the observer position whose value is returned by the position sensor 302.

Figure 5B:
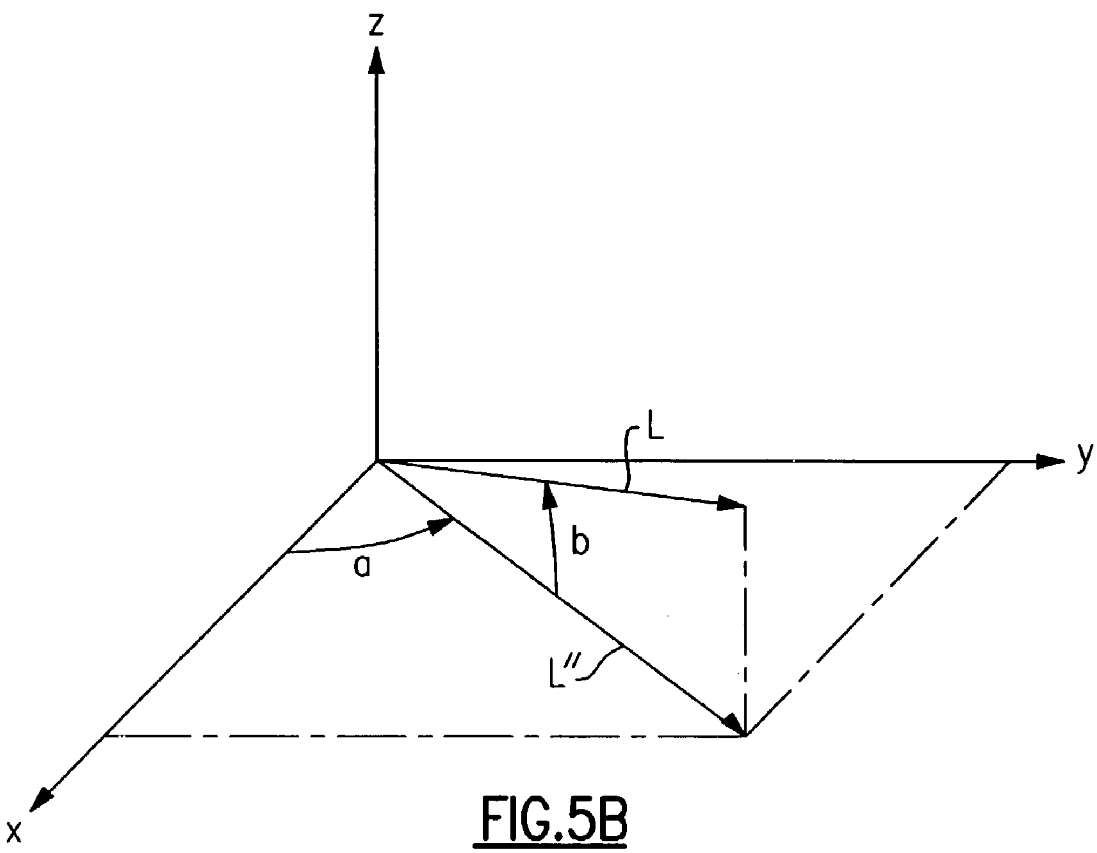

Referring to FIG. 5B, direction sensor 304 expresses the orientation of the wearer as a single angle a or as a pair of angles a and b, depending on the application. More particularly, the angle a indicates the orientation of the line of sight L relative to the x-axis as viewed from above, as shown in this figure. The angle b, on the other hand, represents the upward inclination of the line of sight L relative to the horizontal (x, y) plane, as shown in the same figure. Equivalently, if L" is the projection of L into the (x, y) plane, a is the angle between the x-axis and L", and b is the angle between L" and L.

Preferably, as stated above, direction sensor 304 is mounted on the head of the observer so that he can direct it either horizontally (to vary a) or vertically (to vary b) merely by turning his head. In application scenarios in which the z-coordinate is not used, the second angle b is similarly not used and the direction sensor 304 can be mounted elsewhere on the observer. Direction sensor 304 may be implemented using any of a number of well-known, readily available technologies, such as a compass or a gyroscope. Provided that the direction sensor 304 moves with the part of the wearer's body that it is mounted on and generates the required outputs, the particulars of its implementation form no part of the present invention.

In the discussion that follows, terms such as "line of sight" refer to the ray L emanating from the observer position P (as reported by the position sensor 302) in the direction reported by the direction sensor 304. Obviously, if an observer 102 turns his head (for a torso-mounted direction sensor) or moves his eyes (for a head-mounted direction sensor that does not actually track the movement of the eyes), the reported line of sight may differ from the actual line of sight. However, unless otherwise indicated, it is the reported line of sight L that is referred to herein. An object 108 is a "viewed" object if it lies on or acceptably near (as described below) to the line of sight L.

Identification and retrieval unit 306 is any device capable of performing computations, accessing databases, presenting information to an output device, and the like. It may be realized using a computer embedded in an item the person is wearing, such as clothing, spectacles or (as shown in FIG. 2) a headset, using well-known, readily available technology. Provided that the unit 306 performs the required functions, the particulars of its implementation form no part of the present invention. If the embedded identification and retrieval unit 306 does not have enough storage or computational power, or if presented information needs to be dynamically updated (like prices in a shopping mart), the embedded unit 306 may communicate with a server computer maintained at a remote location such as that of stationary unit 218.

Output device 308 is any device capable of presenting information to the user. Output device 308 may, for example, comprise an audio transducer such as a headphone or a speaker, as shown in FIG. 2. Alternatively, output device 308 may comprise a visual or audiovisual display.

Identification and retrieval unit 306 remotely accesses database 310, which stores items with object IDs and exact position information (2D or 3D, depending on the circumstances). Database 310 also stores information which is presented to the user. As described above, the wireless connection 216 between the identification and retrieval unit 306 and the remote database 310 may be implemented using well-known, readily available technology, the particulars of which form no part of the present invention. Although database 310 is shown as being centralized, it need not be so, the important consideration being that it is remote. For example, a database with multiple servers or with links to rich data that resides on the Internet is also possible, so that the observer could immediately view information on the World Wide Web about the object.

Figure 6:
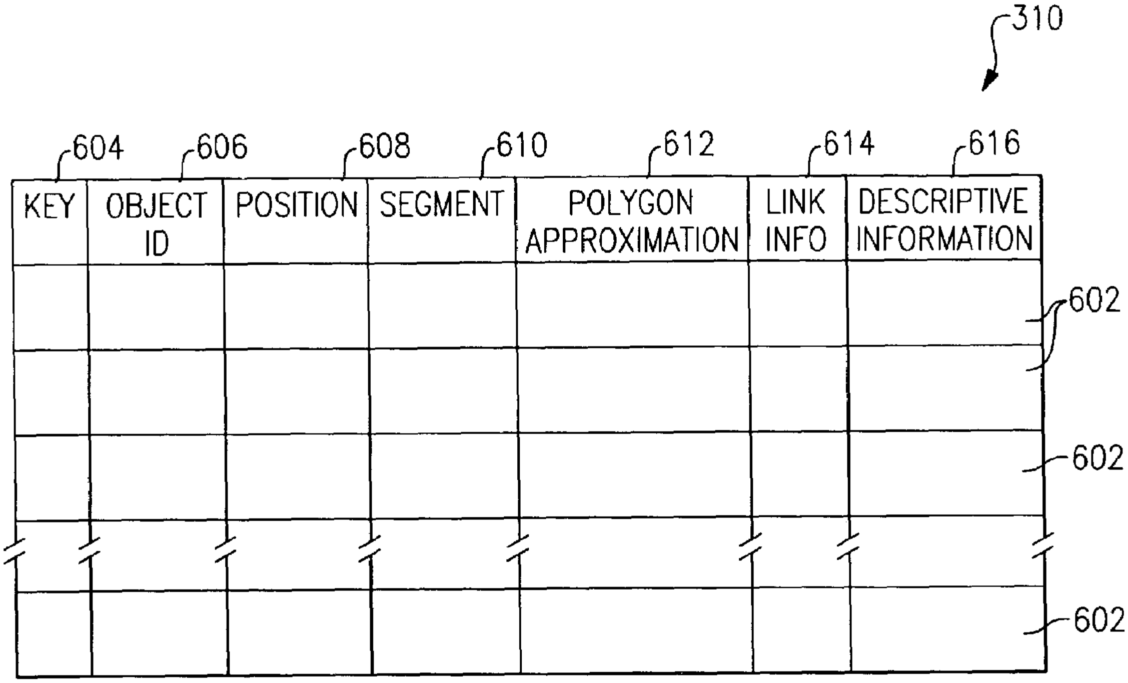
FIG. 6 shows the object database.

Referring to FIG. 6, database 310 may be implemented as a table of a relational database containing a plurality of rows 602. Each row of the table contains information about a particular object 108, including a key 604, an identifier (ID) 606 that references some additional information (such as a foreign key or an object identifier), the x, y and (in a 3D implementation) z position 608 of a center point of the object, a segment 610 in which the object is located, an approximation 612 of an outline of the object, link information 614, and additional descriptive information 616 in either plain text, rich text or multimedia format.

Although the key 604 and the object ID 606 are shown as distinct fields, the object ID could be either a candidate key or a foreign key. One possible model would include the object ID in a table that holds relations between rooms and objects, so that objects can be moved into different rooms.

Segment information 606 structures database 310 into "rooms" or segments, which are subareas containing objects 108 that are visible from one location. Each object 108 can only be in one "room" or segment. Segment information 610 identifies the room or other segment an object 108 is located in. This segment information is used to exclude objects 108 that cannot be seen by the wearer (e.g., because they are on the other side of a wall). This allows for the quick selection of a set of candidate objects that are in the same segment as the observer and avoids use of the ray-tracing procedure to be described (and the corresponding computations) for objects that cannot possible by viewed by the observer.

Outline approximation 612 may comprise a representation of the object 108 as a polygon in the (x, y) plane (for a 2D application) or a polyhedron in (x, y, z) space (for a 3D application). This approximation is used in the ray-tracing procedure to be described to give form (area or volume) to an object. By calculating collisions of rays from the point P with the forms, one can determine whether the object in question will intercept a ray to another object. The outline approximation may be referenced either to the absolute origin or to the center point of the object, as given by the position information 608, so that the coordinates need not be changed unless the object is rotated. In most cases, a rectangle will be sufficiently accurate for the polygonal approximation, while a rectangular prism will suffice for the polygonal approximation.

Link information 614 may explain, for example, how to get from the current object to an object that follows logically so that a guiding system can be implemented. Another possible use of the link information 614 is to provide a pointer to a subsidiary or "child" object that helps define a parent object Thus, for an object that is difficult to model using a simple polygon or polyhedron (e.g., a giant squid), one might add a link to an entry for a child object (e.g., to the tentacles of the squid) that contains a different description than the main body. The child object would in turn contain link information 614 referring back to the main body as represented by the parent object.

In addition to information on objects 108 of interest to the observer 102 (referred to herein as "active" objects), database 310 may also store information on "passive" objects. Passive objects are objects such as walls and partitions that are not of interest to the observer as such, but may block the view of other objects and are therefore represented in the ray-tracing procedure described below. The information stored for a passive object would be similar to that stored for an active object except for such attributes as descriptive information which would not be stored. Information on passive objects may be stored in either the same table as for active objects or in a different table. If stored in the same table, some mechanism (such as an additional field for an active/passive indicator) would be used to distinguish passive objects from active objects, since only rays for active objects are traced, as described further below.

Finally, database 310 would store information on the segments themselves. These segments would be represented in a manner similar to that of the active and passive objects. Thus, in a 2D implementation, database 310 may represent each segment as a polygon in the (x, y) plane. Similarly, in a 3D implementation, database 310 may represent each segment as a polyhedron in (x, y, z) space. This segment information is used together with the position information from position sensor 302 to determine the segment in which the observer is located.

Figure 4:
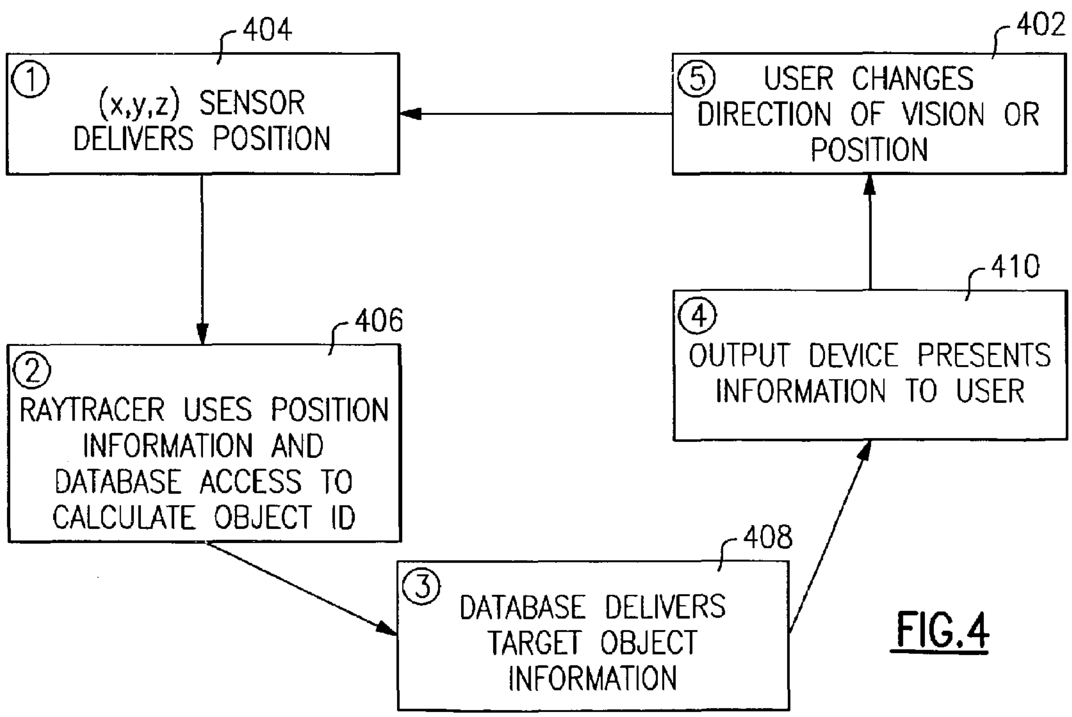
FIG. 4 shows the operation of the present invention.

FIG. 4 shows the procedure 400 used by the present invention to identify and display a sighted object.

The procedure begins when the user 102 changes either his position or his orientation as captured by sensors 302 and 304 (step 402). When this occurs, identification and retrieval unit 306 uses the position information from position sensor 302 to query database 310 to obtain a set of possible objects 108 of interest to the user (step 404). The orientation information from direction sensor is not used at this time to select objects 108 from the database 310. Rather, such objects are selected using a less computationally intensive procedure purely on the basis of positional information from position sensor 302, namely, by determining the segment (e.g., a room) in which the observer 102 is located and selecting those objects located within the same segment as the observer. Any suitable procedure may be used for determining what segment the observer 102 is in, such as one of the solid modeling procedures described at pages 533–562 of J. Foley et al., *Computer Graphics: Principles and Practice* (2d ed. 1990), incorporated herein by reference.

Depending on the size of the segment, it may be that this segment-finding procedure leaves too many objects of interest for the ray-tracing procedure to be described to be performed in a reasonable amount of time. If that is the case, then as an alternative or additional procedure one might eliminate objects that are more than a predetermined distance from the observer. For even greater computational efficiency, rather than calculating the actual 2D or 3D distance between the observer and an object (which involves the summing of squares), one might instead apply the distance criterion along each coordinate axis separately. That is to say, one might eliminate an object from inclusion in this initial set if its x or y (or x, y or z) displacement from the observer exceeds a predetermined distance. These determinations can be readily made using standard database query mechanisms.

Having obtained this initial set of objects 108, identification and retrieval unit 306 then uses the direction information from the direction sensor 304 to perform a second query of the database 310, using the ray-tracing procedure 700 shown in FIG. 7 and described below. Based on the result of step 404 and this second database access, the object ID of the targeted object 108 is returned (step 406).

Based on the object ID obtained in step 406, the database 310 delivers additional information about the targeted object 108 (step 408). This may be done in either the same access as or a different access from that of step 406.

Finally, the additional information is presented to the user via the output device 308 (step 410).

The whole process is executed in a loop. After the user changes his or her position or direction of vision (step 402) in a way that another object ID is returned in step 406, the information presented by the output device 308 automatically changes as well.

Figure 7:
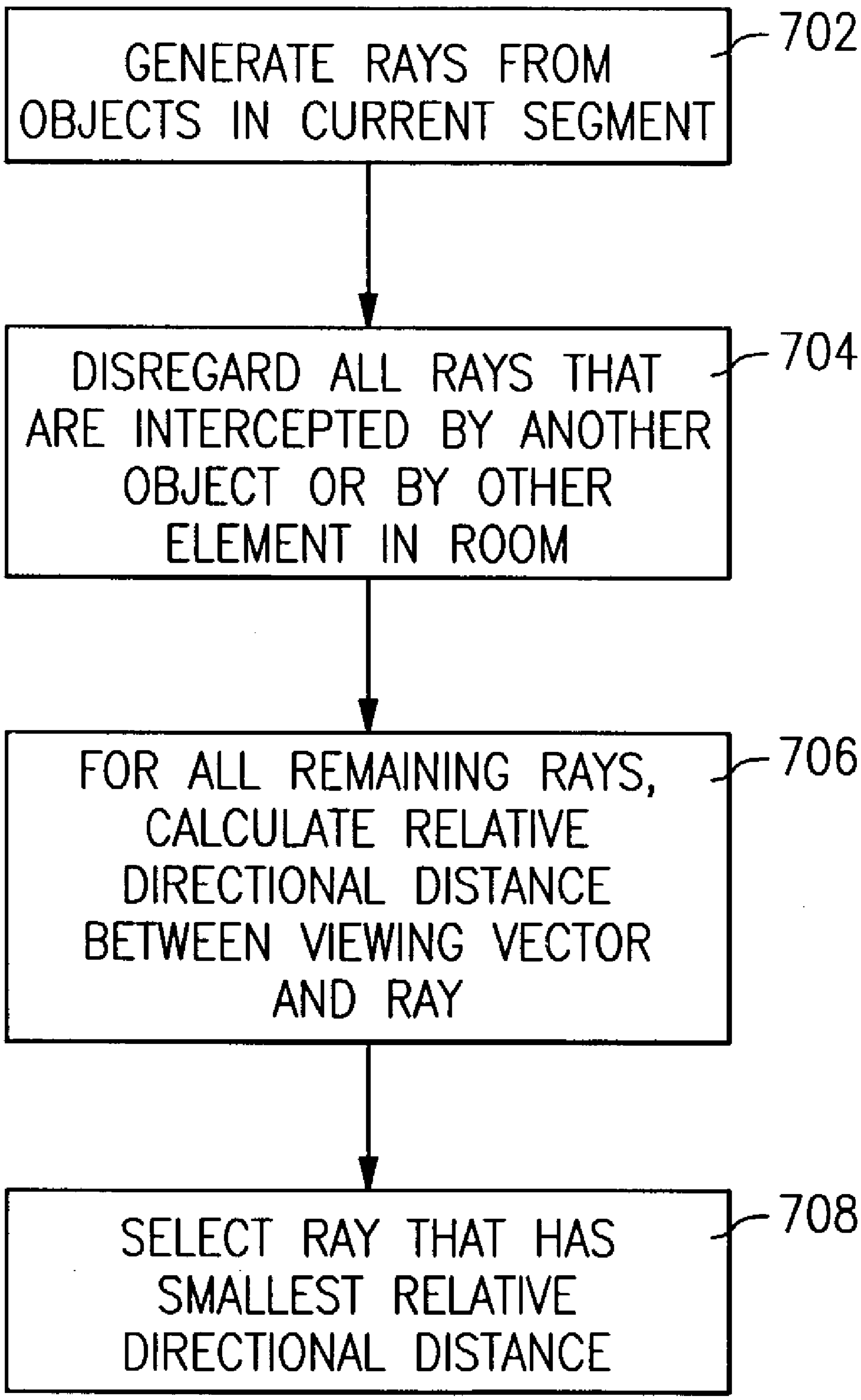
FIG. 7 shows the ray-tracing procedure.

FIG. 7 shows the ray-tracing procedure 700 performed in step 406 to determine the targeted object. Ray tracing is a well-known concept in computer graphics and is described, for example, at pages 701–715 of the above-identified reference of J. Foley et al., incorporated herein by reference. First, for each active object 108 obtained in step 404 (generally those in the current segment), the procedure 700 generates a ray from the object position, as indicated by the position information 608 stored in the database for that object, to the observer's location as indicated by the position information from sensor 302 (step 702). Optionally in step 702, the procedure 700 may generate rays for objects in neighboring segments as well, in case such objects are visible through an entranceway or the like.

After this has been done for each object 108 in the current segment (and optionally one or more adjacent segments), the procedure 700 eliminates any ray that passes though another object (either active or passive) in the segment between the observer and the target object (step 704). All such active and passive objects in the segment are depicted for this purpose using the outline information 612 stored in the database 310 for such objects.

For each remaining ray, the procedure 700 then calculates the relative angular displacement between the viewing vector and the ray (step 706). Finally, the procedure 700 selects the ray that has the smallest relative angular displacement from the viewing vector (step 708).

Figure 8:
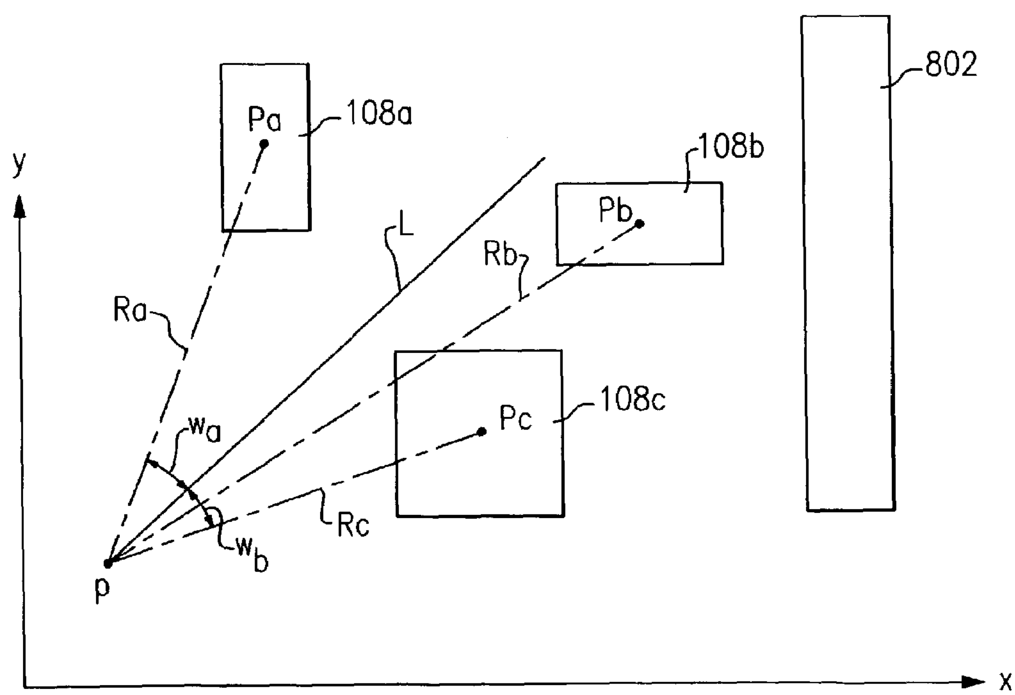
FIG. 8 shows an example of the application of the procedure shown in FIG. 7.

FIG. 8 gives an example of the application of the procedure 700 shown in FIG. 7. FIG. 8 shows active objects 108*a*, 108*b*, and 108*c* (i.e., objects of interest to the observer 102) as well as a passive object 802 (e.g., a partition). Active objects 108*a*, 108*b*, and 108*c* have respective center points Pa, Pb, and Pc, which in turn define respective rays Ra, Rb, and Rc originating from the point P of the observer. All of these rays Ra-Rc are drawn in step 702. In step 704, ray Rb is eliminated since it passes through object 108*c*. (If any ray had passed through a passive object such as object 802, it would have been eliminated as well. However, in this particular example, no rays pass through a passive object.) In step 706, the angles $w_a$ and $w_c$ formed by the remaining rays Ra and Rc with the observer's line of sight L are determined. Finally, in step 708, object 108*c* is selected as the targeted object since its ray Rc forms the smallest angle with the observer's line of sight L.

While a particular implementation has been shown and described, various modifications will be apparent to those skilled in the art. Thus, in the embodiment shown, the identification and retrieval unit becomes active whenever the user changes his position or direction. Alternatively, the identification and retrieval unit could be active continuously or become active at timed intervals. Also, the identification and retrieval unit could be operable to lock onto a particular position and direction or to have a time delay so that the observer could shift his position or head direction without immediately being presented with information about another object. Additionally, while a remote database is described, the identification and retrieval unit could locally cache all or part of the object data to avoid having to rely continuously on the wireless connection. Still other modifications will be apparent to those skilled in the art.

What is claimed is:

1. Apparatus for retrieving information about an object of interest to an observer, comprising:

a position sensor wearable by said observer for generating position information indicating the position of said observer relative to a fixed position;

a direction sensor wearable by said observer for generating direction information indicating the orientation of said observer relative to a fixed orientation; and an identification and retrieval unit for using said position information and said direction information to identify from an object database, to the exclusion of all other objects in said database, an object being viewed by said observer and retrieve information about said object from said object database, wherein said identification and retrieval unit identifies said object by comparing one or more selection criteria for said object with one or more selection criteria for other objects in said object database and said one or more selection criteria include the angle formed by a ray from the observer to an object and a line of sight from the observer.

2. The apparatus of claim 1 in which said direction sensor is wearable on the head of said observer and said direction information indicates the orientation of the head of said observer relative to a fixed orientation.

3. The apparatus of claim 1 in which said object database comprises a remote database.

4. The apparatus of claim 1 in which said identification and retrieval unit determines from the position information and direction information generated for the observer and position information stored in the database for an object whether the object is along a line of sight of the observer.

5. The apparatus of claim 1 in which said identification and retrieval unit is responsive to the generation of new position information or direction information.

6. The apparatus of claim 1 in which said identification and retrieval unit uses said information to provide an audio presentation about said object.

7. The apparatus of claim 1 in which said object database comprises a stationary database accessed by said identification and retrieval unit over a wireless connection.

8. Apparatus for retrieving information about an object of interest to an observer, comprising:

a position sensor wearable by said observer for generating position information indicating the position of said observer relative to a fixed position;

a direction sensor wearable by said observer for generating direction information indicating the orientation of said observer relative to a fixed orientation; and an identification and retrieval unit for using said position information and said direction information to identify from an object database an object being viewed by said observer and retrieve information about said object from said object database, said identification and retrieval unit selecting a set of candidate objects from said object database using a first selection test and selecting a viewed object from said set of candidate objects using a second selection test that is computationally more intensive than said first test.

9. The apparatus of claim 8 in which said objects are located in an area divided into subareas, said identification and retrieval unit selecting a set of candidate objects by determining whether an object is located in a subarea with the observer.

10. The apparatus of claim 9 in which said object database contains subarea information for said objects.

11. The apparatus of claim 8 in which said identification and retrieval unit selects a set of candidate objects by determining whether an object lies within a predetermined distance of the observer.

12. Apparatus for retrieving information about an object of interest to an observer, comprising:

a position sensor wearable by said observer for generating position information indicating the position of said observer relative in a fixed position;

a direction sensor wearable by said observer for generating direction information indicating the orientation of said observer relative to a fixed orientation; and an identification and retrieval unit for using said position information and said direction information to identify from an object database an object being viewed by said observer and retrieve information about said object from said object database, said identification and retrieval unit performing the steps of:

constructing a set of rays from the observer to each of a set of candidate objects;

eliminating from said set of candidate objects any object having a ray that passes though another object to generate a set of remaining objects; and selecting as a viewed object a remaining object having a ray forming a smallest angle with a line of sight from the observer.

13. A method for retrieving information about an object of interest to an observer, comprising the steps of:

generating position information indicating the position of said observer relative to a fixed position;

generating direction information indicating the orientation of said observer relative to a fixed orientation; and using said position information and said direction information to identify from an object database, to the exclusion of all other objects in said database, an object being viewed by said observer and retrieve information about said object from said object database, wherein said object is identified by comparing one or more selection criteria for said object with one or more selection criteria for other objects in said object database and said one or more selection criteria include the angle formed by a ray from the observer to an object and a line of sight from the observer.

14. The method of claim 13 in which said direction information indicates the orientation of the head of said observer relative to a fixed orientation.

15. The method of claim 13 in which said object database comprises a remote database.

16. The method of claim 13 in which said retrieving step comprises the step of:

determining from the position information and direction information generated for the observer and position information stored in the database for an object whether the object is along a line of sight of the observer.

17. The method of claim 13 in which said retrieving step is performed upon the generation of new position information or direction information.

18. The method of claim 13, further comprising the step of:

using said information to provide an audio presentation about said object.

19. The method of claim 13 in which said object database comprises a stationary database accessed over a wireless connection.

20. A method for retrieving information about an object of interest to an observer, comprising the steps of:

generating position information indicating the position of said observer relative to a fixed position;

generating direction information indicating the orientation of said observer relative to a fixed orientation; and using said position information and said direction information to identify from an object database an object being viewed by said observer and retrieving information about said object from said object database, said identifying and retrieving step comprising the steps of:

selecting a set of candidate objects from said object database using a first selection test; and selecting a viewed object from said set of candidate objects using a second selection test that is computationally more intensive than said first test.

21. The method of claim 20 in which said objects are located in an area divided into subareas, said first selection step includes the step of determining whether an object is located in a subarea with the observer.

22. The method at claim 21 in which said object database contains subarea information for said objects.

23. The method of claim 20 in which said first selection step includes the step of determining whether on object lies within a predetermined distance of the observer.

24. A method for retrieving information about an object of interest to an observer, comprising the steps of:

generating position information indicating the position of said observer relative to a fixed position;

generating direction information indicating the orientation of said observer relative to a fixed orientation; and using said position information and said direction information to identify from an object database an object being viewed by said observer and retrieve information about said object from said object database, said identifying and retrieving step including the steps of:

constructing a set of rays from the observer to each of a set of candidate objects;

eliminating from said set of candidate objects any object having a ray that passes though another object to generate a set of remaining objects; and selecting as a viewed object a remaining object having a ray forming a smallest angle with a line of sight from the observer.

* * * * *